Jan. 30, 1968  J. C. FISHER  3,365,799
ANGULAR POSITION MEASURING DEVICE
Filed Jan. 13, 1965
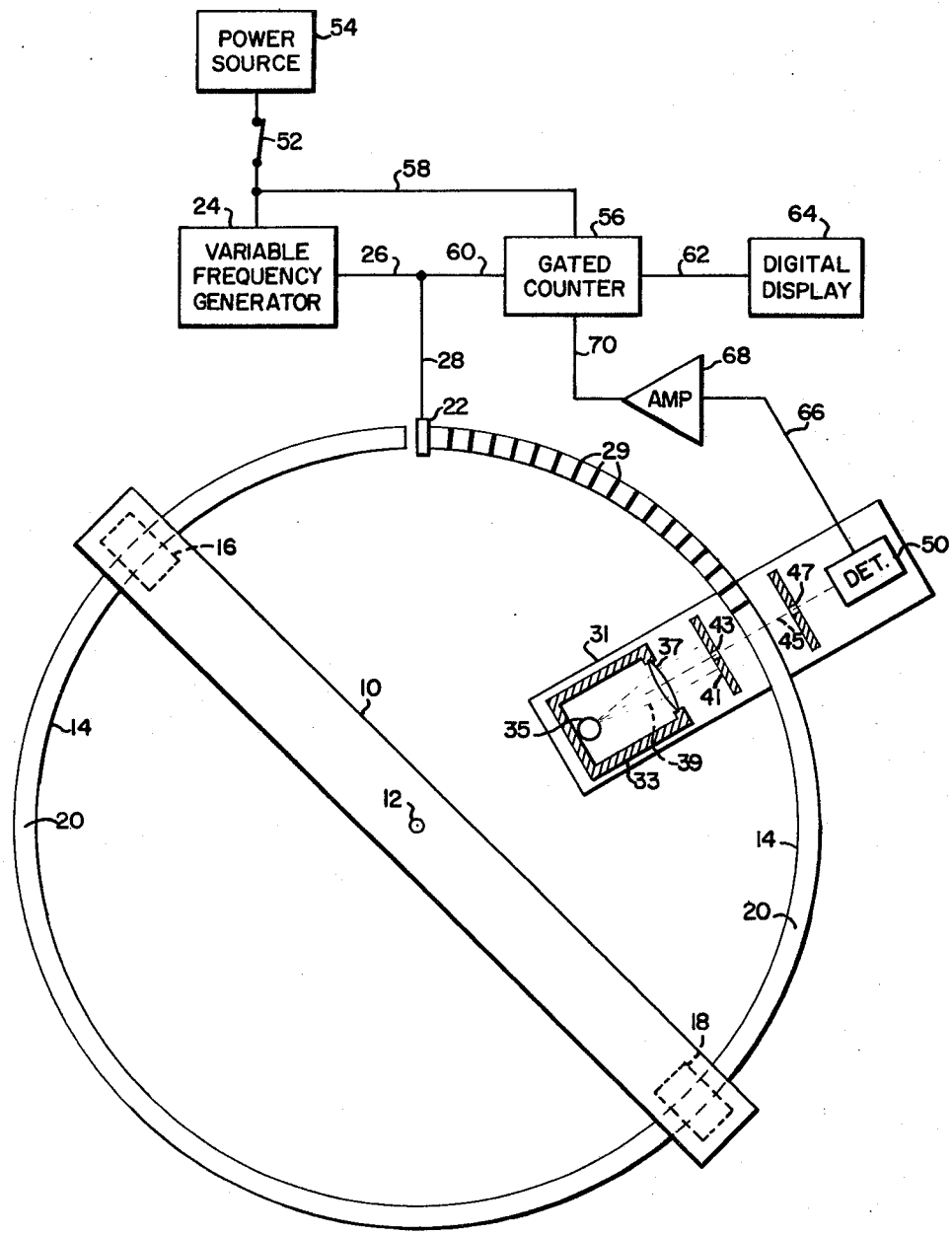
INVENTOR.
JOHN C. FISHER
BY Charles J. Ungemach
ATTORNEY United States Patent Office 3,365,799
Patented Jan. 30, 1968

3,365,799
ANGULAR POSITION MEASURING DEVICE
John C. Fisher, Chisago City, Minn., assignor to Honeywell Inc., Minneapolis, Minn., a corporation of Delaware
Filed Jan. 13, 1965, Ser. No. 425,221
4 Claims. (Cl. 33—1)

ABSTRACT OF THE DISCLOSURE

Transparent fluid such as water, pentane or nitric acid contained in a ring-shaped tube transmits a sonic wave from a piezoelectric generator fixed to the tube to a relatively movable optical pickoff which senses the refractive effect of the compressional wave upon a light beam sent across the tube. Readout in relative angular displacement between source and pickoff is obtained by electrical circuitry correlating the start of the wave and its detection by the pickoff.

---

This invention relates generally to rotation measuring devices, and more particularly to a unique and novel angle encoder which may be quickly and easily adjusted to operate with varying degrees of accuracy. Although the present invention is described in its preferred embodiment as a device to indicate the angle through which an object rotates, it should be understood that this invention may be used in a variety of other applications such as analogue to digital conversion, rotation velocity measurement, and general position indication.

In the prior art, angle encoders have been produced which depend upon dividing the circumference of a disc into a large number of identifiable segments and optically identifying these segments at various positions of the disc. Both the resolution and accuracy of these devices are limited by the physical problems of precisely inscribing, and subsequently identifying, the large number of radial lines or segments inscribed about the circumference of the disc. For instance, one of these prior art devices currently available contains more than 16,000 lines photographically inscribed on a 4½ inch diameter disc.

Briefly, the present invention improves upon this type of angle encoder by generating a series of sonic waves along the length of a liquid filled transparent tube which, in this instance, is formed as a circumference about the axis of interest. The waves are generated by means of a piezoelectric transducer, such as a barium titanate transducer, from a reference point on the transparent tube. The transparent tube is mounted so as to rotate with the object of interest and a light source is mounted on a base so as to transmit a narrow beam of light crosswise through the transparent tube and the acoustic medium to a light detector. As the sonic waves progress along the acoustic medium inside the transparent tube, they pass through the narrow light beam and the pressure gradient associated with the first sonic wave deflects the beam. This deflection is detected by the light detector so as to allow the measurement of the time necessary for the sonic wave to travel from the aforementioned reference point to the light beam. This time, then, is indicative of the angle between the reference point and the light source which is mounted on the base.

The first object of this invention is to provide an improved angle encoder.

A further object of this invention is to provide an angle encoder in which the resolution and accuracy may be changed and precisely controlled.

Further objects and advantages will become apparent in the following description and drawings in which:

FIGURE 1 is a schematic diagram of a preferred embodiment of my invention.

In FIGURE 1 the rotating member is shown as member 10 and is shown as rotatable about an axis 12. A transparent tube 14 is formed into a circle and mounted to rotatable member 10 by means of a pair of brackets 16 and 18 so as to rotate with member 10. Tube 14 is filled with a transparent fluid 20 which will support sonic pressure waves, such as water, pentane, or nitric acid. Tube 14 is bounded at one end by a sonic transducer 22. Transducer 22 is driven by a varible frequency generator 24 by means of a nonrestraining electrical connection shown schematically in FIGURE 1 as conductor 26 and conductor 28. Conductor 28 may be a slip ring or other suitable device to transmit the signal from generator 24 to transducer 22 as transducer 22 rotates with the tube 14. Transducer 22 operates to generate a series of sonic or pressure waves along the fluid in tube 14. These waves are shown as a set of small black lines 29.

A nonmoving base 31 has a light enclosure 33 mounted upon it which contains a light source 35 and a collimating lens 37. Source 35 generates light shown as dashed lines 39 towards collimating lens 37 which projects the light in parallel rays onto a screen 41. A small hole 43 in screen 41 allows a thin beam of light 45 to pass through tube 14 to another small hole 47 and thence to a light detector 50.

The present invention operates in the following manner. When a switch 52 is closed, a power source 54 causes generator 24 to generate a constant predetermined frequency along conductor 26 and 28 to transducer 22. Power source 54 also signals a gated counter 56 by means of a conductor 58 so that counter 56 may begin to count the number of cycles generated by generator 24 and transmitted to counter 56 by means of conductor 26 and a conductor 60. Thus, as the series of waves 29 begin to propagate along tube 14 from transducer 22, gated counter 56, by counting the number of cycles, in effect, counts the number of wave lengths in tube 14 and records them by means of a conductor 62 on a readout such as a digital display 64. After a certain number of wave lengths have been generated, the first wave generated will reach the point on tube 14 at which light beam 45 passes through tube 14. This first wave front causes a change in the refractive index of the liquid which causes light beam 45 to deflect so that it no longer passes through the hole 47. This reduction of light causes light detector 50 to send a signal along a conductor 66 to an amplifier 68 which, by means of a conductor 70, causes gated counter 56 to cease counting. Consequently, the accumulated count on display 64 is representative of the number of wave lengths between the reference point on tube 14 at transducer 22 and the intersection of the light beam 45 with tube 14. Thus, the angle between these two points may be accurately determined. The degree of resolution and accuracy desired may be increased simply by increasing the frequency at which generator 24 operates. This will cause the wave lengths between the wave fronts 29 to become smaller, thus affording a smaller unit of measurement and, hence, a greater degree of resolution.

A possible variation of this operation would be to generate only one wave along the tube 14 and time its passage by other means than counting the number of wave lengths. It should be understood also that the tube 14 may be placed on the base and the readout light source and detector may be mounted on the rotating member while maintaining a similar operation in the system as a whole.

Numerous other variations and modification may oe made to the basic invention disclosed herein. For instance, instead of measuring the time of transit or waves along tube 14, a standing pressure wave may be established in the tube. This would create a series of evenly spaced nodes around the circumference of tube 14. Each of these nodes would be at the location of a density gradient which was oscillating from positive to negative at the same frequency as that generated by generator 24. At the antinodes there would be little or no density gradient and thus the light passing through would not be refracted appreciably. Thus, a light beam passing through the tube 14 would oscillate back and forth at the frequency of generator 24 if it were at a node and would pass directly through if it were at an antinode. This effect could be monitored by a suitable array of light detectors and utilized to measure the position and rotation of tube 14.

Another possibility is to utilize two light sources placed approximately one quarter wave length apart on tube 14 so that the signals generated by the detectors which receive each of the two beams after they pass through tube 14 would have a sine or cosine relationship depending on their position within one wave length of the acoustic wave in the fluid inside tube 14. Comparison of these two signals by means well known in the art would yield a precise determination of the position of the two beams within any particular wave length.

Another variation is to control the output of the exciting oscillator by means of the optical detector so that the acoustic path from the transducer to the light beam constitutes the frequency determining element in the oscillatory circuit. With this variation the frequency and phase may be a function of the position of the light beam relative to the reference transducer.

I desire it to be understood, therefore, that this invention is not limited to the particular form shown and described, and I intend in the appended claims to cover all modifications which do not depart from the spirit and scope of this invention.

What I claim:
1. In a rotation measuring device the combination of a ring shaped tube surrounding the axis of rotation, a transparent fluid contained by said tube, a transducer operable to generate waves in said fluid along said tube about the axis of rotation, optical means to record the change of refractive index of the liquid at a predetermined point on said tube caused by the pasage of said wave, and means to determine the distance travelled by said waves between said transducer and said predetermined point.

2. In a rotation measuring device, the combination of a substantially transparent ring shaped tube concentric to and encircling the axis of rotation and adapted to rotate about the axis, a substantially transparent fluid contained within said tube, a transducer operable to generate sound waves in said fluid along said tube, light beam means positioned so as to cause said light beam to pass through said tube at a point on said tube proximate to a known fixed point, light detector means operable to record the deflection of said light beam caused by a change in the refractive index of said fluid, said change in refractive index being a result of the passage of said sound waves, and means timing the deflection of said light beam relative to the transmission of said sound waves at said transducer.

3. In apparatus to measure the rotation of a member relative to a base the combination of a light transmissive tube concentric to and encircling the axis of rotation and adapted to rotate with said member;
a substantially transparent fluid in said tube;
a magnetostrictive transducer operative to transmit compressional waves through said fluid;
means generating a desired frequency signal;
means presenting said signal to said transducer to cause periodic compressional waves to be transmitted through said fluid and along said tube;
light beam projecting means;
means mounting said projecting means and positioned on said base in a predetermined location so that said light beam passes through said tube and said fluid;
light detector means operative to determine a change in path of said light beam caused by a change of the refractive index of said fluid, said change in refractive index being caused by the presence of said compressional waves in said tube; and
means counting the number of cycles generated by said generating means until said light detector means indicates the deflection of said light beam, the accumulated account indicative of the number of wave lengths required to span from said transducer to said light beam.

4. In an angular position measuring device, the combination of a substantially transparent movable tube; a substantially transparent fluid contained within said tube, a transducer operable to generate sound waves in said fluid along said tube, light beam means positioned so as to cause said light beam to pass through said tube at a point on said tube proximate to a known fixed point, light detector means operable to record the deflection of said beam caused by a change in the refractive index of said fluid, said change in refractive index being a result of the passage of said sound waves, and means timing the deflection of said light beam relative to the transmission of said sound waves at said transducer.

References Cited

UNITED STATES PATENTS

| | | |
|---|---|---|
| 2,401,094 | 5/1946 | Nicholson. |
| 2,418,964 | 4/1947 | Arenberg _____ 324—68 |
| 2,575,759 | 11/1951 | Higinbotham et al. ____ 324—68 |
| 2,734,188 | 2/1956 | Jacobs. |
| 2,780,795 | 2/1957 | Ambrosio. |
| 2,848,698 | 8/1958 | Howey et al. _____ 33—125 X |
| 3,003,239 | 10/1961 | Weidner et al. _____ 33—125 X |
| 3,121,955 | 2/1964 | King _____ 33—125 X |
| 3,189,746 | 6/1965 | Slobodin et al. ____ 250—237 X |

FOREIGN PATENTS 1,314,616  12/1962  France.

OTHER REFERENCES

Product Engineering, Dec. 21, 1964, page 47.

ROBERT B. HULL, *Primary Examiner.*